W. J. COOK.
MANURE SPREADER.
APPLICATION FILED MAR. 29, 1910.
1,154,236.
Patented Sept. 21, 1915.
2 SHEETS—SHEET 1.
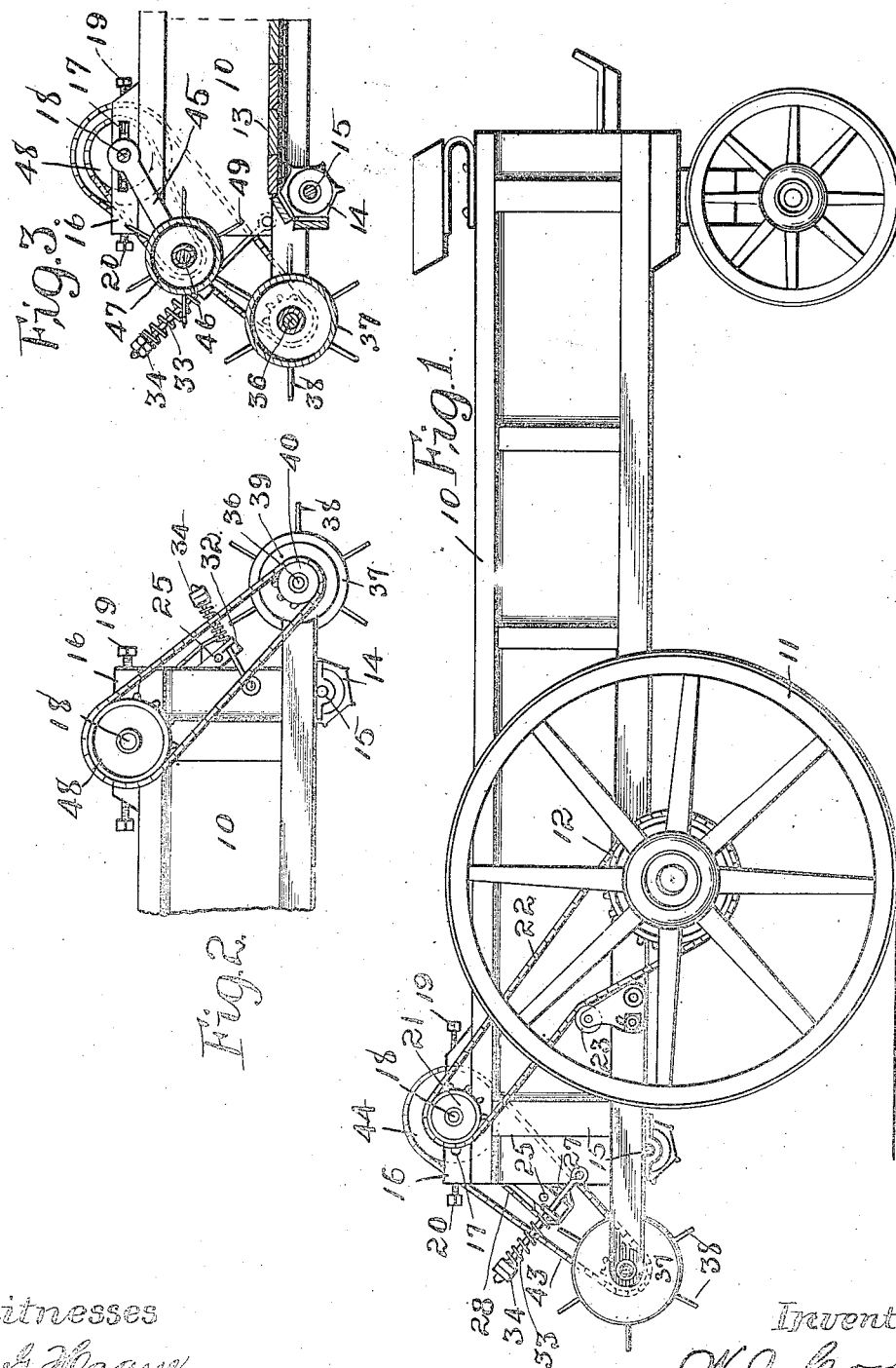
Witnesses
Inventor
W. J. Cook.

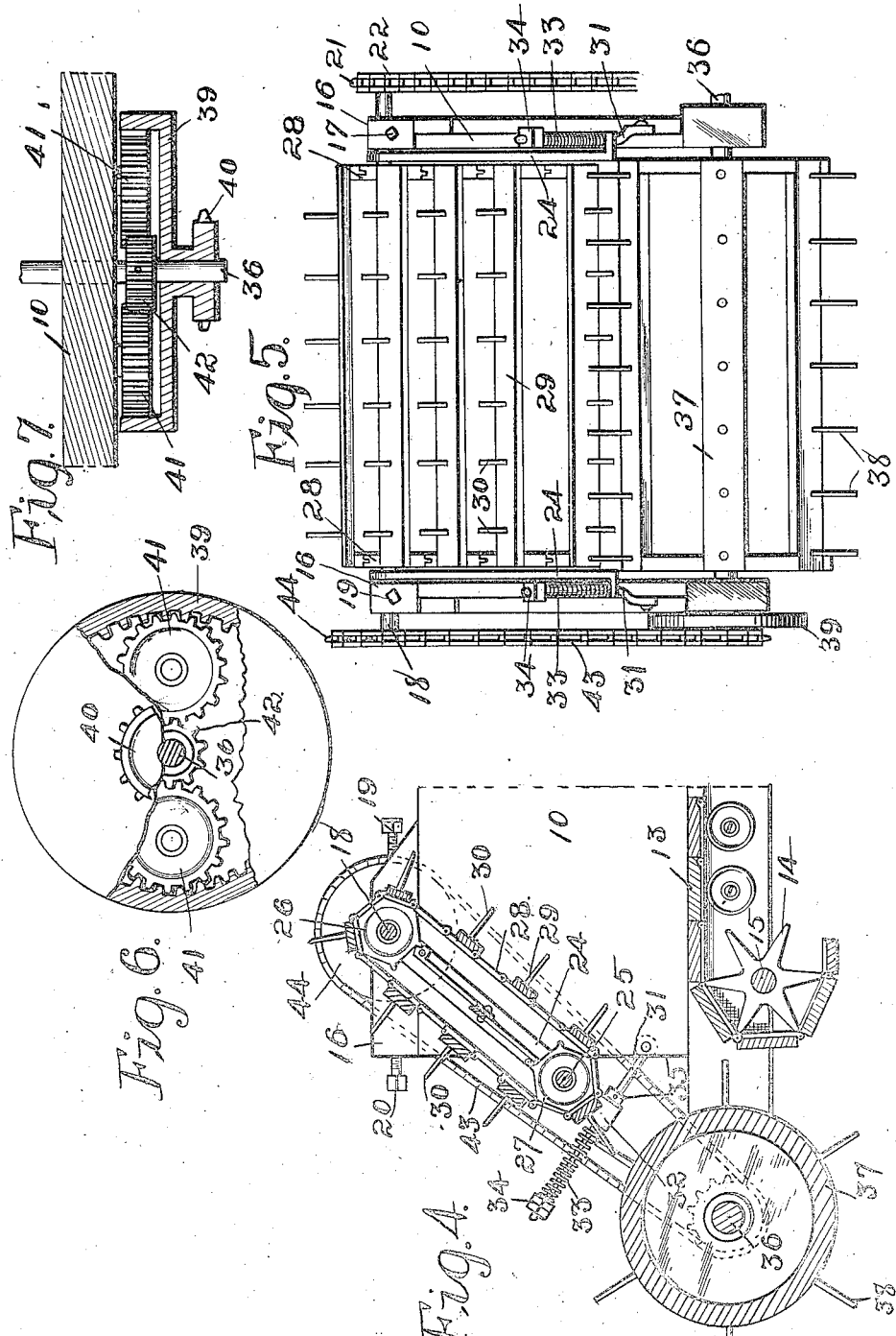

UNITED STATES PATENT OFFICE.

WILLARD J. COOK, OF DES MOINES, IOWA.

MANURE-SPREADER.

1,154,236.
Specification of Letters Patent.
Patented Sept. 21, 1915.

Application filed March 29, 1910. Serial No. 552,264.

*To all whom it may concern:*

Be it known that I, WILLARD J. COOK, a citizen of the United States, residing at Des Moines, in the county of Polk and State of Iowa, have invented a certain new and useful Manure-Spreader, of which the following is a specification.

My invention relates to and consists in certain new and useful improvements in manure spreaders and particularly in an improvement upon the United States Letters Patent, Number 947,374, on manure spreaders issued to me January 25, 1910.

My present invention is designed to accomplish all of the objects set forth in the above noted patent and in addition to this it is my object to provide improved means whereby the manure engaging device that is designed to contact with the load of manure upon the movable apron and to tear it apart and to discharge it to the rapidly rotating spreading cylinder at the rear is so arranged that it may have a limited yielding upward movement so that in the event that a hard and unyielding object or a tightly compressed quantity of material is delivered by the movable apron to said device, it may move upwardly against yielding pressure to thereby prevent said device from becoming broken or subjected to undue strains, and further, in this connection, to provide means for adjusting said device so that it may apply greater or less pressure upon the material being delivered from the apron.

My invention consists, in certain details, in the construction, arrangement and combination of the various parts of the device, whereby the objects contemplated are attained, as hereinafter more fully set forth, pointed out in my claims and illustrated in the accompanying drawings, in which:

Figure 1 shows a side elevation of a manure spreader having my improvements applied thereto. Fig. 2 shows a detail view of the rear of the spreader taken from the side opposite that shown in Fig. 1. Fig. 3 shows a longitudinal, sectional view of the rear of a manure spreader embodying my invention and illustrating a modified form. Fig. 4 shows a detail, sectional view of the rear of the manure spreader embodying the preferred form of my invention. Fig. 5 shows a rear end elevation of a manure spreader embodying my invention. Fig. 6 shows an enlarged, detail view, partly in section, illustrating a speed increasing gearing device applied to the lower, or spreading cylinder, and Fig. 7 shows a sectional view of same.

Referring to the accompanying drawings, I have used the reference numeral 10 to indicate the wagon body and 11 the rear or traction wheels thereof. On one of the traction wheels a sprocket wheel 12 is provided to impart power for operating the spreading mechanism hereinafter described.

Mounted in the bottom of the wagon bed 10 is an endless apron 13 of ordinary construction designed to be driven by the spur wheel 14 on the shaft 15. This apron and its driving means may be of any of the ordinary constructions now in common use and of itself forms no part of my present invention. Mounted on top of the rear end of the wagon are the bearing blocks 16 provided with horizontally arranged slots 17 in which a shaft 18 is rotatably mounted. This shaft may be adjusted longitudinally of the wagon bed by means of the set screws 19 and 20. I provide for rotating said shaft by means of a sprocket wheel 21 fixed to one end of it and connected by a sprocket chain 22 with the sprocket wheel 12. A chain tightener 23 of ordinary construction is applied to said chain to take up any slack therein that may be caused by adjusting the shaft 18 in its supporting bearings. Rotatably mounted upon the shaft 18 between the sides of the wagon bed are the supporting arms 24 which extend downwardly and rearwardly. Mounted in the lower ends of the arms 24 is a rotatable shaft 25. The said shafts 18 and 25 are provided with sprocket wheels 26 and 27 over which are passed the sprocket chains 28, which chains are provided with cross slats 29 having teeth 30. By this arrangement it is obvious that when the shaft 18 is rotated the endless conveyer consisting of the chains and cross slats will be operated. The forward portion thereof will move downwardly and rearwardly. In order to provide an adjustable yielding pressure for the lower rear end of said endless conveyer, I have provided at each end thereof a rod 31 pivoted to the side of the wagon bed and extended rearwardly and upwardly and past an extension 32 on the adjacent arm 24. An extensible coil spring 33 is placed on the rear end portion of this rod to engage the extension 32 and an adjusting nut 34 is placed on the rear end of the rod. In order to limit the forward end of the rear end of the endless conveyer, I provide a nut 35 on the rod 31 to engage the extension 32. By means of the conveyer device above described, it is obvious that when the wagon is advanced the shaft 18 will be rotated and when said shaft is rotated the forward portion of the endless conveyer will move downwardly and rearwardly and will engage the material on the apron 13 and tear it apart and discharge it at the rear of the wagon bed. In the event that any hard object of a tightly compressed quantity of material should be engaged by said endless conveyer the spring 33 will yield and the rear lower end of the conveyer will swing upwardly against the spring pressure and against the action of gravity upon the rear end of the conveyer to thereby permit said object or mass of material to pass out without subjecting the teeth of the endless conveyer to undue strains. This endless conveyer is so connected by gearing devices with the traction wheels that it will move at a comparatively slow rate of speed as its only object is to tear apart the material on the apron 13 and to deliver it at the rear end of the wagon bed and it is not intended to perform any function of throwing the material outwardly and rearwardly as required for spreading it over a comparatively large area.

For the purpose of spreading the material thus delivered over a large area and for tearing it apart, I provide a spreading cylinder of the kind illustrated and described in my patent before referred to. This spreading device comprises a shaft 36 mounted at the rear of the wagon bed. Fixed to this shaft is the spreader cylinder 37 of ordinary construction and provided with teeth 38. The position of the spreading cylinder 37 with relation to the rear lower end of the endless conveyer is such that when the said endless conveyer is in the position shown in Fig. 4; that is to say, its normal position when in use, the teeth 38 will overlap the teeth 30 in such a manner that the rapidly moving teeth of the cylinder 38 will coact with the slowly moving teeth 30 of the endless conveyer to thereby clean both the endless conveyer and the spreading cylinder and prevent accumulation of material upon said teeth. However when the lower end of the endless conveyer is moved upwardly and rearwardly the teeth temporarily will move out of coacting positions but will immediately assume said positions when the object which caused the endless conveyer to be raised has passed through. I have provided for operating the cylinder 37 in a direction with its top portion moving rearwardly and at a high speed as follows: Rotatably mounted upon one end of the shaft is an internal gear wheel 39 having a sprocket wheel 40 connected with it. The internal gear wheel 39 is in mesh with two pinions 41 which are mounted on a stationary part of the machine frame, as shown in Fig. 7, and fixed to the shaft 36 is a pinion 42 in mesh with both of the pinions 41. The said sprocket wheel 40 is rotated during the advance of the machine by means of a sprocket chain 43 which chain passes around a sprocket wheel 44 on the shaft 18. Obviously by means of this gearing device, movements applied to the internal gear wheel 39 of the sprocket wheel 40 will be greatly increased as applied to the pinion 42 and its movement will be reversed so that the top of the cylinder 37 will move rearwardly.

In the modified form, illustrated in Fig. 3, I have mounted upon the shaft 18 a supporting arm 45 having at its rear end a shaft 46 upon which a cylinder 47 is fixed. This shaft is driven by means of a sprocket gearing 48 connected with the shaft 18 and the said cylinder 47 is provided with teeth 49 to coact with the teeth of the spreading cylinder 37. The same means are employed in this modified form for applying a yielding pressure to the arm 45 as to the rear end of the endless conveyer in the preferred form. By this arrangement the said cylinder 47 may move up and down relative to the apron 13 in the same manner as the rear end of the endless conveyer illustrated in my preferred form of the invention.

In practical use, it is obvious that the unloading device consisting either of the endless conveyer or the toothed cylinder may be started even though the load of material on the apron is resting close against it and that this may be done readily and easily with a comparatively slight amount of power for the reason that the material on the endless apron is engaged by the teeth and moved downwardly and rearwardly, and for the further reason that the teeth of the unloading device move at comparatively slow speed. This will have the effect of partially tearing apart the material on the apron and delivering it in a uniform manner at the discharge end of the spreader. In the event that any hard or unyielding object or a tightly compressed mass of material is engaged by the said teeth, the rear end of the endless conveyer will swing upwardly and rearwardly against the action of gravity and the pressure of the springs so that it may pass out from the discharge end of the machine without injury to the conveyer or the conveyer teeth, and also without the movement of the unloading device. By having the unloading device adjustable it may be arranged at different angles to meet the requirements of the material being distributed and by having an adjustable yielding pressure applied to the unloading device, it may be held more or less firmly against the loaded material to have a greater or less tearing-apart effect on same. All of the material thus delivered to the spreading cylinder will be further torn apart and thrown rearwardly and upwardly to a considerable distance on account of the high speed of the spreading cylinder. Furthermore, comparatively little power is required for operating the cylinder for the reason that it does not directly engage a solid portion of the material but only receives the material in small quantities from the unloading device so that it may be kept rotating at high speed with comparatively little more power than would be required to operate a balance wheel of equal weight.

I claim as my invention:

1. In a manure spreader, the combination of a wagon body, an apron on the bottom of the wagon body, an unloading device over the apron, comprising a toothed rake device above the discharge end of the apron extended downwardly and rearwardly and designed to engage the body of material on the apron, and also designed when operated to have said rake device tear the material apart and deliver said portions of it that have been torn apart from the body of the material in a downward and rearward direction, and a spreading cylinder so arranged with relation to the apron and the delivering device that it will be protected by the said delivering device from direct contact with any of the material on the apron, and said spreading cylinder being so arranged that the material delivered to it by the delivering device will strike upon its upper portion and be thrown upwardly and rearwardly when the spreading cylinder is being rotated.

2. In a manure spreader, the combination of a wagon body to support the material, a spreading cylinder arranged at the discharge end of said body and in position to be out of engagement with the material resting upon the body, means for rotating it in a direction with its top moving rearwardly away from the body, and an unloading device in position above the discharge end of the body and in position to engage material on the body, means for moving the forward portion of said unloading device downwardly to deliver material from the body on the spreading cylinder, means for yieldingly supporting the unloading device so that the part thereof adjacent to the spreading cylinder may move upwardly in a direction away from the discharge end of the body, and adjustable means for limiting the movement of the unloading device toward the discharge end of the body.

3. In a manure spreader, the combination of a wagon body, a spreading cylinder arranged at the discharge end of said wagon body, means for rotating it in a direction with its top moving rearwardly away from the body, and an unloading device for moving material from the body to the spreading cylinder, said unloading device being located above the spreading cylinder and being capable of movement toward and from the spreading cylinder, said unloading device being also provided with teeth for engaging material, means for moving the teeth at the forward portion of the unloading device in a downward direction to deliver material to the spreading cylinder, and a spring pressure device for yieldingly holding the unloading device in a direction toward the spreading cylinder.

4. In a manure spreader, the combination of a wagon body to support the material, a spreading cylinder arranged at the discharge end of said body and in position to be out of engagement with the material resting upon the body, means for rotating it in a direction with its top moving rearwardly away from the body, and an unloading device in position above the discharge end of the body and in position to engage material on the body, means for moving the forward portion of said unloading device downwardly to deliver material from the body on the spreading cylinder, means for yieldingly supporting the unloading device so that the part thereof adjacent to the spreading cylinder may move upwardly in a direction away from the discharge end of the body, a spring pressure device for yieldingly holding the unloading device in a direction toward the discharge end of the body, and means for adjusting the tension of said spring pressure device.

5. In a manure spreader, the combination of a wagon body to support the material, a spreading cylinder arranged at the discharge end of said body and in position to be out of engagement with the material resting upon the body, means for rotating it in a direction with its top moving rearwardly away from the body, and an unloading device in position above the discharge end of the body and in position to engage material on the body, means for moving the forward portion of said unloading device downwardly to deliver material from the body on the spreading cylinder, means for yieldingly supporting the unloading device so that the part thereof adjacent to the spreading cylinder may move upwardly in a direction away from the discharge end of the body, and means for adjusting the unloading device forwardly and rearwardly relative to the discharge end of the body.

6. In a device of the class described, the combination of a wagon body, a spreading device arranged at the discharge end of said wagon body and in position to receive material from the body, means for moving said spreading device in a direction for throwing material rearwardly, and an unloading device in position above the material at the discharge end of the body, means for moving the forward portion of said unloading device in a direction downwardly and rearwardly to deliver material from the body to the spreading device, and means for yieldingly supporting the unloading device so that the part thereof adjacent to the spreading device may move upwardly in a direction away from the discharge end of the body to permit the passage of large obstructions between it and the discharge end of the body.

7. In a device of the class described, the combination of a wagon body to receive material to be distributed, a spreading device in position to receive material from the discharge end of the wagon body, means for operating it in a direction to throw material rearwardly; and an unloading device, comprising an endless conveyer pivoted at its upper end and extended downwardly and toward the discharge end of the wagon body, its lower portion being capable of swinging rearwardly and upwardly away from the spreading device, and means for operating said conveyer.

8. In a manure spreader, the combination of a wagon body, an unloading device comprising a toothed endless conveyer extended transversely across the body above its discharge end and inclined downwardly and rearwardly, means for operating said conveyer with its forward portion moving downwardly and rearwardly; adjustable means for limiting the forward movement of the lower portion of said conveyer device, an adjustable yielding pressure device tending to hold the lower end of the conveyer device toward the discharge end of the body, a spreading cylinder arranged in the rear of the body in position out of contact with material carried by the body and designed to receive the discharge from said conveyer, and means for rotating the spreading cylinder at comparatively high speed.

9. In a manure spreader, the combination of a wagon body, an unloading device comprising a toothed endless conveyer extended transversely across the body, above its discharge end and inclined downwardly and rearwardly, means for operating said conveyer with its forward portion moving downwardly and rearwardly, adjustable means for limiting the forward movement of the lower portion of said conveyer device, an adjustable yielding pressure device tending to hold the lower end of the conveyer device toward the discharge end of the body, means for adjusting the upper end of said conveyer device in a direction longitudinal of the body, a spreading cylinder arranged in the rear of the body in position out of contact with material carried by the body and designed to receive the discharge from said conveyer, and means for rotating the spreading cylinder at comparatively high speed.

10. In a device of the class described, the combination of a wagon body to receive material to be distributed, a spreading device in position to receive material from the discharge end of the wagon body, means for operating it in a direction to throw material rearwardly, and an unloading device, comprising an endless conveyer pivoted at its upper end and extended downwardly and toward the discharge end of the wagon body, its lower portion being capable of swinging rearwardly and upwardly away from the spreading device, means for operating said conveyer, and a spring applied to the unloading device for yieldingly holding its lower portion in a direction toward the spreading device.

11. In a manure spreader, the combination of a body and an apron carried by the body, a shaft extended across the body above its discharge end, means for rotating said shaft, means for adjusting said shaft longitudinally of the body, a supporting device pivoted concentric of said shaft and extended downwardly and rearwardly, a shaft rotatably mounted at the lower ends of said supporting device, an endless toothed conveyer passed around said shafts, adjustable means for limiting the movement of the lower end of the conveyer device toward the discharge end of the body, an adjustable spring device for yieldingly holding the lower end of the conveyer device toward the discharge end of the body, a spreading cylinder arranged in position to receive the discharge from the unloading device and in position wholly out of contact with material on the body, and means for rotating the spreading cylinder at a comparatively high speed in a direction with its top portion moving rearwardly, for the purposes stated.

12. In a manure spreader, the combination of a body and an apron carried by the body, a shaft extended across the body above its discharge end, means for rotating said shaft, means for adjusting said shaft longitudinally of the body, a supporting device pivoted concentric of said shaft, and extended downwardly and rearwardly, a shaft rotatably mounted at the lower ends of said supporting device, an endless toothed conveyer passed around said shafts, adjustable means for limiting the movement of the lower end of the conveyer device toward the discharge end of the body, an adjustable spring device for yieldingly holding the lower end of the conveyer device toward the discharge end of the body, a spreading cylinder arranged in position to receive the discharge from the unloading device and in position wholly out of contact with material on the body, and means for rotating the spreading cylinder by power from the driving shaft of the unloading device in a direction with its top portion moving rearwardly, said means including a speed increasing gearing device.

13. In a device of the class described, the combination of a wagon body, an unloading device comprising a frame pivotally supported at its upper end and extended downwardly and toward the discharge end of the wagon body, a conveyer thereon, means for operating the conveyer in such a manner that its forward portion moves downwardly and rearwardly in a path above the bottom of the wagon body, and said parts being so arranged that a large obstruction in the material on the body will cause the lower end of the frame on, which the conveyer is mounted to move upwardly and rearwardly away from the body.

14. In a device of the class described, the combination of a wagon body, an unloading device comprising a frame pivotally supported at its upper end, and extended downwardly and toward the discharge end of the wagon body, a toothed conveyer thereon, means for operating the conveyer so that its forward portion moves downwardly and rearwardly, said frame being so arranged that a large obstruction in the material on the wagon body will cause the lower end of the frame to move upwardly and rearwardly away from the body, a yielding pressure device applied to the frame for yieldingly holding its lower end toward the discharge end of the wagon body, and a spreading device arranged to receive the discharge from said unloading device.

15. In a device of the class described, the combination of a wagon body, an apron on the bottom of the wagon body designed to move material rearwardly toward the discharge end of the wagon body, an unloading device comprising a frame pivotally supported at its upper end, and extended downwardly and toward the discharge end of the wagon body, a toothed conveyer thereon, means for operating the conveyer so that its forward portion moves downwardly and rearwardly, said frame being so arranged that a large obstruction in the material on the wagon body will cause the lower end of the frame to move upwardly and rearwardly away from the body, a yielding pressure device applied to the frame for yieldingly holding its lower end toward the discharge end of the wagon body, and a spreading device arranged to receive the discharge from said unloading device.

16. In a device of the class described, the combination of a wagon body, an apron on the bottom of the wagon body designed to move material rearwardly toward the discharge end of the wagon body, and an unloading device, comprising a frame pivoted to the body at its upper end and extended downwardly and rearwardly, an endless conveyer on said frame, means for moving the endless conveyer so that its forward portion moves downwardly and rearwardly to engage material on the apron, the said frame being so arranged that a large obstruction on the apron will cause said frame to be elevated so that the obstruction may pass beyond it without injury to the device, a yielding pressure device applied to the said frame for normally holding its rear lower end portion toward the discharge point of the apron, and a spreading device, comprising a cylinder arranged in position to receive material from the unloading device, means for moving it so that its upper portion moves rearwardly to discharge material delivered to it from the unloading device.

17. In a device of the class described, the combination of a wagon body, an apron on the bottom of the wagon body, designed to move material rearwardly toward the discharge end of the wagon body, and an unloading device, comprising a frame pivoted to the body at its upper end and extended downwardly and rearwardly, an endless conveyer on said frame, means for moving the endless conveyer so that its forward portion moves downwardly and rearwardly to engage material on the apron, the said frame being so arranged that a large obstruction on the apron will cause said frame to be elevated so that the obstruction may pass beyond it without injury to the device, a yielding pressure device applied to the said frame for normally holding its rear lower end portion toward the discharge point of the apron, a spreading device, comprising a cylinder arranged in position to receive material from the unloading device, means for moving it so that its upper portion moves rearwardly to discharge material delivered to it from the unloading device, and means for operating said spreading cylinder at a relatively high speed as compared with the movement of the endless conveyer of the unloading device.

Des Moines, Iowa, March 19, 1910.

WILLARD J. COOK.

Witnesses:
  WM. E. WHITESIDE,
  FRANK YOUNG.